United States Patent
Espinoza et al.

(10) Patent No.: US 6,958,363 B2
(45) Date of Patent: Oct. 25, 2005

(54) HYDROGEN USE IN A GTL PLANT

(75) Inventors: Rafael L. Espinoza, Ponca City, OK (US); Sergio R. Mohedas, Ponca City, OK (US); Ralph T. Goodwin, III, Ponca City, OK (US); Stephen R. Landis, Katy, TX (US); Barbara A. Belt, Seabrook, TX (US)

(73) Assignee: ConocoPhillips Company, Houston, TX (US)

( * ) Notice: Subject to any disclaimer, the term of this patent is extended or adjusted under 35 U.S.C. 154(b) by 237 days.

(21) Appl. No.: 10/388,905

(22) Filed: Mar. 15, 2003

(65) Prior Publication Data

US 2004/0180974 A1 Sep. 16, 2004

(51) Int. Cl.⁷ .......................... C07C 27/00; C10G 15/00
(52) U.S. Cl. ...................... 518/709; 518/702; 518/703; 518/726; 208/106
(58) Field of Search ................................. 518/700, 702, 518/703, 709, 726; 208/106

(56) References Cited

U.S. PATENT DOCUMENTS

| | | | |
|---|---|---|---|
| 3,702,886 A | 11/1972 | Argauer et al. | 423/328 |
| RE29,948 E | 3/1979 | Dwyer et al. | 208/110 |
| 5,431,855 A | 7/1995 | Green et al. | 252/373 |

(Continued)

FOREIGN PATENT DOCUMENTS

| | | |
|---|---|---|
| DE | 3345064 A1 | 6/1985 |
| DE | 3345088 A1 | 6/1985 |
| EP | 0269297 A1 | 6/1988 |
| EP | 1188713 A2 | 3/2002 |
| WO | WO 00/43336 | 1/2000 |
| WO | WO 0009441 | 2/2000 |
| WO | WO 0142175 A1 | 6/2001 |
| WO | WO 02/020395 | 3/2002 |

OTHER PUBLICATIONS

International Search Report (PCT/US2004/007912), Aug. 23, 2004, 5 pages.
International Search Report (PCT/US2004/007913), Aug. 16, 2004, 4 pages.
International Search Report (PCT/US2004/007914), Aug. 16, 2004, 4 pages.

*Primary Examiner*—J. Parsa
(74) *Attorney, Agent, or Firm*—Conley Rose P.C.

(57) ABSTRACT

The present invention provides a process for managing hydrogen in a hydrocarbon gas to liquid plant. The process includes passing a syngas feed stream produced by a partial oxidation reactor to a Fischer-Tropsch reactor, thereby converting the syngas to hydrocarbon liquids. The hydrogen management process further includes passing a second hydrogen rich stream produced by an auxiliary source to a hydrogen user such as an FT water stripper, an FT catalyst regeneration unit, and an FT product upgrading unit. The auxiliary source could be a process for converting hydrocarbons to syngas, a process for converting hydrocarbons to olefins, a process for converting hydrocarbons to aromatics, a process for catalytically dehydrogenating hydrocarbons, a process for catalytically cracking hydrocarbons, a process for refining petroleum, and a process for converting hydrocarbons to carbon filaments.

20 Claims, 1 Drawing Sheet

U.S. PATENT DOCUMENTS

| | | | |
|---|---|---|---|
| 5,500,149 A | 3/1996 | Green et al. | 252/373 |
| 5,628,931 A | 5/1997 | Lednor et al. | 252/373 |
| 5,654,491 A | 8/1997 | Goetsch et al. | 568/469.9 |
| 5,888,470 A | 3/1999 | Engler et al. | 423/650 |
| 5,925,799 A | 7/1999 | Stanley et al. | 585/259 |
| 5,980,596 A | 11/1999 | Hershkowitz et al. | 48/127.9 |
| 6,043,288 A | 3/2000 | DeGeorge et al. | 518/715 |
| 6,072,097 A | 6/2000 | Yokoyama et al. | 585/658 |
| 6,143,202 A | 11/2000 | Christensen et al. | 252/373 |
| 6,147,126 A | 11/2000 | DeGeorge et al. | 518/715 |
| 6,156,809 A | 12/2000 | Clark et al. | 518/719 |
| 6,248,794 B1 * | 6/2001 | Gieskes | 518/700 |
| 6,402,989 B1 | 6/2002 | Gaffney | 252/373 |
| 6,409,940 B1 | 6/2002 | Gaffney et al. | 252/373 |
| 6,512,018 B2 | 1/2003 | Kennedy | 518/715 |
| 2002/0006374 A1 | 1/2002 | Kourtakis et al. | 423/418.2 |
| 2002/0009407 A1 | 1/2002 | Kourtakis et al. | 423/418.2 |
| 2002/0032244 A1 | 3/2002 | Benham et al. | 518/715 |
| 2003/0040655 A1 | 2/2003 | Budin et al. | 585/627 |

* cited by examiner

HYDROGEN USE IN A GTL PLANT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to the production of hydrocarbons. More specifically, the invention relates to a process for managing hydrogen in a gas to liquid (GTL) plant.

BACKGROUND OF THE INVENTION

Large quantities of natural gas are available in many areas of the world, and natural gas is predicted to outlast oil reserves by a significant margin. However, natural gas reserves have been found in remote areas where it is uneconomical to develop the reserves due to the lack of local markets for the gas and the high cost of transporting the gas to distant markets. This high cost is often related to the extremely low temperatures needed to liquefy the highly volatile gas during transport. An alternative is to locally convert the natural gas to liquid hydrocarbon products that can be transported more cost effectively. Processes for converting light hydrocarbon gases, such as natural gas, to heavier hydrocarbon liquids are generally known in the art.

One such process, commonly know as gas to liquids (GTL) production, involves the conversion of natural gas to synthesis gas (syngas) comprising hydrogen ($H_2$) and carbon monoxide (CO), followed by feeding the syngas to a Fisher-Tropsch (FT) process for conversion to primarily $C_5+$ hydrocarbons via a Fischer-Tropsch reaction. The GTL production includes processes and steps that consume hydrogen. It would be desirable to achieving optimization of the GTL production by managing hydrogen production and distribution. Managing hydrogen generated from the natural gas or from other sources in accordance with the present invention provides for optimization of the Fischer-Tropsch process and the overall GTL plant and increases process flexibility and reliability.

SUMMARY OF THE INVENTION

The present invention is a process for managing hydrogen in a hydrocarbon gas to liquid plant, thereby providing for the optimization of the GTL plant. The process includes passing a syngas feed stream produced by a partial oxidation reactor to a Fischer-Tropsch reactor, thereby converting the syngas to hydrocarbon liquids.

The hydrogen management process further includes passing a hydrogen-rich stream produced by an auxiliary source (i.e., a hydrogen generator) to at least one hydrogen user in the GTL plant. The hydrogen-rich stream may also be subjected to a separation process such as a WGS process to further increase the hydrogen content therein before being passed to the hydrogen users. In some embodiments, the auxiliary source is at least one of a steam reformer, an autothermal reformer, a process for producing primarily olefins such as hydrocarbon cracking, oxidative dehydrogenation, and dehydrogenation, a process for converting hydrocarbons to aromatics, a process for converting hydrocarbons to carbon filaments, a process for refining petroleum, and combinations thereof. The hydrogen users are, for example, a process for stripping water from a slurry from the FT reactor, a process for regenerating a Fischer-Tropsch catalyst, and an upgrading or refining process for processing the hydrocarbon liquids produced in the FT reactor into hydrocarbon products. As used herein, "hydrocarbon products" refers to materials that can be used as components of at least one of naphtha, diesel, kerosene, jet fuel, lube oil and wax, which are mixtures known in the art.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
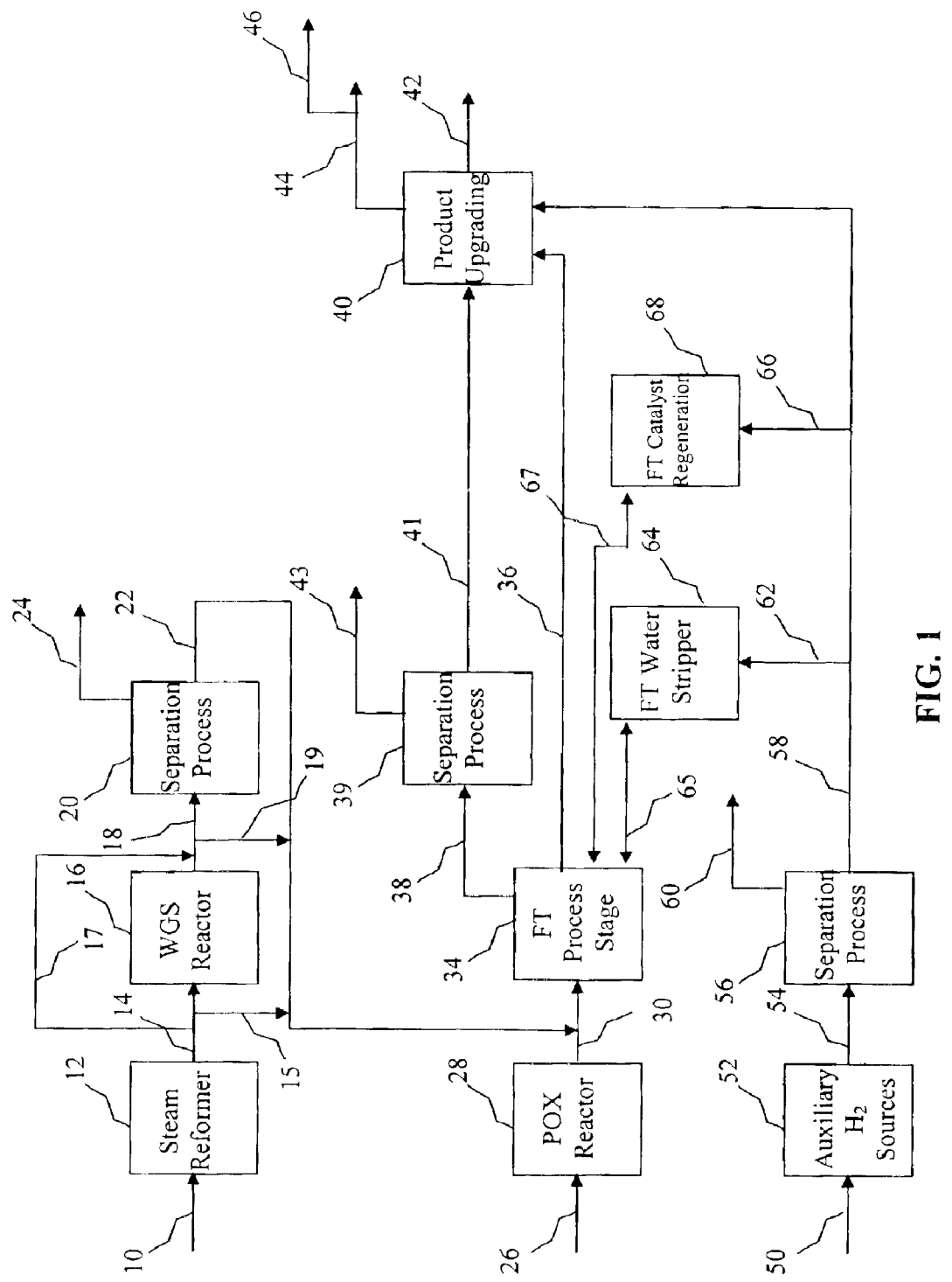
FIG. 1 is a simplified block flow diagram of a hydrocarbon gas to liquid plant in accordance with the present invention, wherein a hydrogen-rich stream is produced by at least one auxiliary source for use in supplying various hydrogen users in the gas to liquid plant.

The present invention provides a process for managing hydrogen generated in a plant for converting natural gas to useful liquid products, thereby making the GTL plant more cost effective. FIG. 1 depicts a hydrogen-containing stream produced by a steam reformer being introduced to a feed stream of a FT process stage. As used herein, process stage refers to a process stage comprising one or more reactors, wherein a given conversion of syngas to hydrocarbons is achieved. In a multi-stage process, a plurality of process stages are arranged in series such that a subsequent or downstream stage receives unreacted reactants (e.g., syngas) and some of the products from a prior or upstream stage and further converts the unreacted reactants to hydrocarbons, thereby increasing the overall percent conversion of reactants as they pass from stage to stage until a final desired conversion percentage is obtained. Furthermore, reaction conditions typically vary from stage to stage, and the present invention addresses managing hydrogen in the feed to optimize operation of a multi-stage process. In alternative embodiments, the number of process stages may be optimized based on the desired throughput of the process.

As shown in FIG. 1, the hydrogen rich stream mentioned above may be produced by first passing a substantially oxygen-free feed stream 10 comprising steam ($H_2O$) and one or more low molecular weight paraffinic hydrocarbons to a steam reformer 12. The low molecular weight paraffinic hydrocarbon may be obtained from any available source. In preferred embodiments, feed stream 10 comprises a mixture of mainly steam and methane ($CH_4$) recovered from a gas plant for processing natural gas. Any known configuration may be employed for steam reformer 12. For example, a steam reformer typically contains catalyst-filled tubes housed in a furnace. Steam reformer 12 contains any suitable catalyst and is operated at any suitable conditions effective to promote the conversion of a hydrocarbon and steam to hydrogen ($H_2$) and carbon monoxide (CO). In the case where the hydrocarbon is methane, steam methane reforming (SMR) proceeds by the following endothermic reaction:

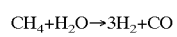

The catalyst employed for the steam reforming process preferably comprises one or more catalytically active components such as palladium, platinum, rhodium, iridium, osmium, ruthenium, nickel, chromium, cobalt, cerium, lanthanum, or mixtures thereof. The catalytically active component may be disposed on a catalyst support such as a ceramic pellet or a refractory metal oxide. The steam reforming process is preferably performed at a high temperature in the range of from about 600° C. to about 1,100° C. and more preferably in the range of about from 800° C. to about 1,100° C. It is also preferably performed at a high pressure of from about 5 atm to about 30 atm.

The effluent stream 14 recovered from steam reformer 12 contains $H_2$, CO, unreacted $CH_4$ (or other hydrocarbon), and unreacted $H_2O$. Optionally, in a preferred embodiment, effluent stream 14 is passed to a water gas shift (WGS) reactor 16 to convert at least a portion of the CO contained therein to carbon dioxide ($CO_2$) and $H_2$ in the presence of a catalyst. The WGS reaction proceeds according to the following exothermic reaction:

$$CO + H_2O \leftrightarrow CO_2 + H_2$$

The WGS reactor 16 is preferably operated at a temperature in the range of from about 200° C. to about 1100° C., more preferably from about 200° C. to about 450° C. The temperature selected depends on the WGS catalyst composition, the amount of conversion desired, and the temperature of the incoming reactant gases. Typically, the lower the temperature, the higher the concentration of $H_2$ at equilibrium conditions. The WGS reactor can also be operated at a pressure in the range of from about 1 atmosphere to about 300 atmospheres. Any known catalyst suitable for promoting the WGS reaction may be disposed in the WGS reactor. Examples of such catalysts include, but are not limited to, iron based catalysts such as $Fe_3O_4/Cr_2O_3$ and copper based catalysts such as $CuO/ZnO/Al_2O_3$. The Cu based catalysts are low temperature type catalysts but tend to be unstable. The preferred operation temperature range for Cu based catalysts is from 180° C. to about 260° C. Above that range, the catalysts start to deactivate due to sintering of the active component, Cu. The Fe based catalysts are very stable but have lower activities that require higher temperatures. The preferred operation temperature range for Fe based catalysts is from about 300° C. to about 550° C.

A hydrogen rich stream 18 primarily comprising $H_2$ exits WGS reactor 16. Hydrogen rich stream 18 also comprises $CO_2$ and the unreacted reactants of the steam reforming and WGS processes. In a preferred embodiment, hydrogen rich stream 18 is passed to a separation process 20 for removing the $CO_2$ from hydrogen rich stream 18, as indicated by stream 24. In addition, a portion of effluent stream 14, i.e., slip stream 17, from steam reformer 12 may be introduced to hydrogen rich stream 18. Separation process 20 may include a $CO_2$ removal process based on an amine system. Also, separation process 20 may include, for example, a pressure swing adsorption (PSA) unit and/or a membrane separation unit. The hydrogen rich stream 22 exiting separation process 20 comprises greater than about 80% by volume $H_2$ per total volume of the stream, preferably greater than about 85% by volume $H_2$, and more preferably greater than about 90% by volume $H_2$. As used throughout the specification, the symbol "%" represents the term "percent". Hydrogen rich stream 22 may be introduced to a syngas stream 30 that is being fed to FT process stage 34. More details related to this introduction of hydrogen rich stream 22 can be found later in the specification.

FIG. 1 also depicts a FT process in which a feed stream 26 comprising a mixture of at least one hydrocarbon and oxygen ($O_2$) is passed to a partial oxidation (POX) reactor 28. Partial oxidation reactor 28 is preferably a catalytic partial oxidation (CPOX) reactor, but it may alternatively be a non-catalytic partial oxidation reactor. Feed stream 26 preferably comprises primarily $C_1$ to $C_5$ hydrocarbons, preferably at least 50% methane, and more preferably at least 80% methane, that has been separated from other components of a natural gas stream in a gas plant (not shown). The oxygen contained within feed stream 26 is preferably pure oxygen; however, feed stream 26 may alternatively comprise another source of oxygen, e.g., air, oxygen-enriched air, oxygen mixed with an inert gas (i.e., a diluent), and so forth. The gases in feed stream 28 are typically pre-heated, mixed, and passed over or through a catalyst bed disposed within POX reactor 30, which preferably is a short-contact time reactor (SCTR) such as a millisecond contact time reactor. Suitable SCTR's are described in U.S. Pat. Nos. 6,409,940 and 6,402,989. The methane (or other hydrocarbon) and the oxygen contained in feed stream 28 are converted to syngas upon contact with the catalyst bed. Partial oxidation of methane proceeds by the following exothermic reaction:

$$2CH_4 + O_2 \rightarrow 2CO + 4H_2$$

POX reactor 28 contains any suitable partial oxidation catalyst for promoting the partial oxidation of methane (or other hydrocarbon) to syngas. Partial oxidation catalysts are well known to those skilled in the art. Partial oxidation catalysts typically comprise a catalytically active metal on a support structure. The support structure often dictates the type of catalyst bed that may be used. For example, fixed beds typically comprise monoliths and large particle sized supports, and small particle sized supports tend to be more useful in fluidized beds. Exemplary catalytically active metals include palladium, platinum, rhodium, iridium, osmium, ruthenium, nickel, chromium, cobalt, cerium, lanthanum, or mixtures thereof. Within POX reactor 28, methane (or other hydrocarbon) is contacted with the catalyst in a reaction zone that is maintained at conversion-promoting conditions effective to produce $H_2$ and CO. Preferably, POX reactor 28 is operated at mild conditions to avoid the formation of unwanted by-products. Suitable partial oxidation processes, conditions, and catalysts for use with the present invention are disclosed in, for example, U.S. Pat. Nos. 6,402,989 and 6,409,940; published PCT application WO 02/20395; and published U.S. Pat. Applications 2002-0006374 and 2002-0009407, each of which is incorporated by reference herein in its entirety.

A syngas stream 30 primarily comprising $H_2$ and CO is recovered from POX reactor 28. Oxygen, carbon dioxide, water, and light hydrocarbons may also be present in syngas stream 30. The syngas stream 30 is fed to a Fischer-Tropsch process stage 34 for conversion to hydrocarbons and water. The FT process stage may have one or more FT synthesis reactors arranged in parallel. FT synthesis reactors produce hydrocarbons which may be paraffinic hydrocarbons (saturated hydrocarbons), olefinic hydrocarbons (unsaturated hydrocarbons), oxygenates (oxygen-containing compounds), or any combination thereof. A process stage may comprise one or more reactors arranged in parallel. Alternatively, syngas stream 30 may be fed to a multi-stage process comprising two or more FT process stages in series. The feed gases charged to the FT process comprise hydrogen, or a hydrogen source, and carbon monoxide. Preferably, the hydrogen is provided by free hydrogen, although some Fischer-Tropsch catalysts have sufficient water gas shift activity to convert some water and carbon monoxide to carbon dioxide and hydrogen for use in the FT process. It is preferred that the molar ratio of hydrogen to carbon monoxide in syngas stream 30 be greater than 0.5:1 (e.g., from about 0.67:1 to about 2.5:1). Preferably, when cobalt, nickel, and/or ruthenium catalysts are used for the FT synthesis, syngas stream 30 contains hydrogen and carbon monoxide in a molar ratio of from about 1.6:1 to about 2.3:1. Preferably, when iron catalysts are used, syngas stream 30 contains hydrogen and carbon monoxide in a molar ratio of from about 1.4:1 to about 2.3:1. Syngas stream 30 may also contain carbon dioxide. Further, syngas stream 30 should contain only a low concentration of compounds or elements that have a deleterious effect on the catalyst such as poisons. For example, syngas stream 30 may need to be pretreated to ensure that it contains low concentrations of sulfur or nitrogen compounds such as hydrogen sulfide, hydrogen cyanide, ammonia, and carbonyl sulfides.

In a preferred embodiment, hydrogen rich stream 22, a portion of effluent stream 14 (i.e., slipstream 15), and a portion of hydrogen rich stream 18 (i.e., slipstream 19), each of which contains $H_2$ produced by stream reformer 12, are introduced to syngas feed stream 30 to adjust the $H_2$ content therein (i.e., increase the $H_2$/CO ratio). The $H_2$/CO ratio in syngas feed stream 30 is adjusted to a value in the range of preferably from about 1.5 to about 3.0, more preferably from about 1.7 to about 2.4, this value being dependant on the type of catalyst and process conditions utilized in the FT process. For a multi-stage process, and for a H2/CO ratio in the feed lower than the stoichiometric ratio, the $H_2$/CO ratio drops with each successive pass through each process stage. In this case, hydrogen rich stream 22, slipstream 15, and slipstream 19 can be introduced to the feed stream of each process stage for the purpose of raising the $H_2$/CO ratio therein.

Any suitable catalyst for promoting the conversion of $H_2$ and CO to hydrocarbons may be employed for FT process stage 34. The FT catalyst includes an active catalyst component either unsupported or supported on a material. The support material (also known as the catalyst support) may be a porous material that provides mechanical support for the active catalyst component. Examples of suitable support materials include boehmite and refractory oxides such as silica, alumina, titania, thoria, zirconia, or mixtures thereof such as silica-alumina. Other examples of suitable support materials are aluminum fluorides and fluorided alumina. The active catalyst component comprises at least one metal from Groups 8, 9, or 10 of the Periodic Table (based on the new IUPAC notation). Preferably, the active catalyst component is iron, cobalt, nickel, ruthenium, or mixtures thereof. The amount of active catalyst component present in the catalyst may vary. For instance, the unsupported catalyst may comprise up to about 90% by weight of active metal per total weight of the catalyst. The supported catalyst may comprise from about 1 to 50% by weight of the metal component per total weight of the metal component and support material, preferably from about 5 to 40% by weight, and more preferably from about 10 to 35% by weight. In addition, the FT catalyst may also comprise one or more promoters known to those skilled in the art. Suitable promoters include Group 1 metals, Group 2 metals, Group 3 metals, Group 4 metals, Group 5 metals, and Group 11 metals. Typically, at least a portion of the metal is present in a reduced state (i.e., in the metallic state). Therefore, the FT catalyst is preferably activated prior to use by a reduction treatment.

During the FT conversion process, each FT reaction zone is maintained at conversion-promoting conditions effective to produce the desired hydrocarbons. The Fischer-Tropsch process is typically run in a continuous mode. In this mode, the gas hourly space velocity through the reaction zone typically may range from about 50 $hr^{-1}$ to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (1 atm or 101 kPa) and temperature (0° C. or 273.16 K). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range of from about 160° C. to about 300° C. Preferably, the reaction zone is operated at temperatures of from about 190° C. to about 260° C. The reaction zone pressure is typically in the range of about 80 psia (552 kPa) to about 1000 psia (6895 kPa), more preferably from 80 psia (552 kPa) to about 600 psia (4137 kPa), and still more preferably, from about 140 psia (965 kPa) to about 500 psia (3447 kPa).

Any suitable reactor configuration or mechanical arrangement that allows contact between the syngas and the FT catalyst may be employed for the one or more FT reactors in FT process stage 34. Examples of suitable FT reactors include slurry-bubble reactors, fixed bed reactors such as tubular reactors, and multiphase reactors with a stationary catalyst phase. In a slurry-bubble reactor, the FT catalyst particles are suspended in a liquid, e.g., molten hydrocarbon wax, by the motion of bubbles of syngas sparged into the bottom of the reactor. As the gas bubbles rise through the reactor, the syngas is absorbed into the liquid where it diffuses to the catalyst for conversion to hydrocarbons. Gaseous products and unconverted syngas enter the gas bubbles and are collected at the top of the reactor. Liquid products are recovered from the suspending liquid using different techniques such as filtration, settling, hydrocyclones, and magnetic techniques. Cooling coils immersed in the slurry remove heat generated by the reaction. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. Multiphase reactors having a stationary catalyst phase are described in U.S. patent application Ser. No. 10/238,008, filed Sep. 9, 2002, entitled "Gas Agitated Multiphase Reactor with Stationary Catalyst Solid Phase", which is incorporated by reference herein in its entirety.

In the FT process, $H_2$ and CO combine in a polymerization-like fashion to form hydrocarbon compounds having varying numbers of carbon atoms. An effluent stream 36 produced by FT process stage 34 comprises liquid compounds containing five to more than 100 carbon atoms in their molecule such as hydrocarbon liquids, including paraffins, oxygenates, and olefins. A gas stream 38 comprising various components such as $H_2O$, $CO_2$, unreacted $H_2$ and CO, and light hydrocarbons having primarily about one to six carbon atoms also exits FT process stage 34. Gas stream 38 is passed to a separation process 39 to cool the components therein in one or more steps to one or more temperatures. In this manner, the condensable components (e.g., $H_2O$ and hydrocarbons) are separated from the non-condensable components (e.g., $H_2$ and CO), thereby forming a liquid product stream 41 and an FT gas effluent stream 43. Optionally, a portion of FT gas effluent stream 43, which comprises unconverted syngas and light hydrocarbons, may be recycled back to the inlet of the FT reactor or stage from which it came or sent to the inlet of any other FT reactor or stage. Furthermore, a portion of an FT gas effluent from another FT reactor may be recycled or sent to the inlet of FT process stage 34 or to the inlet of reactors therein. In the case where FT gas effluent stream 43 is recycled, it may be subjected to separation and/or purification processes before re-entering the reactor to where it is being recycled or sent. At least a portion of stream 43 may also be utilized as fuel in various units of the GTL plant such as pre-heaters and gas turbines. Examples of suitable pre-heaters are an FT process pre-heater, a fractionator column pre-heater, and an FT product upgrading pre-heater. An example of a gas turbine is one that is employed to generate electricity for the GTL plant.

Liquid product stream 41 and effluent stream 36, which comprise the hydrocarbons produced by the FT process, are passed to a product upgrading process 40 to form various products. Upgrading process 40 may include, for example, a hydrotreater, a hydrocracker, and a separation unit such as a fractionator (not individually shown). In one possible embodiment of the product upgrading process, the hydrocarbons are subjected to hydrogenation in the hydrotreater, and then the products of the hydrotreater are sent to a fractionation tower. The heavy products exiting the bottom of the fractionation tower are then fed to a hydrocracker in the presence of $H_2$ to form a lower average molecular weight product.

Various embodiments and various arrangements of hydrocracker, hydrotreater(s) and fractionator(s) in an FT product upgrading section, which are suitable for use in upgrading process 40, are disclosed in the co-owned U.S. patent application entitled "Methods for Treating Organic Compounds and Treated Organic Compounds," filed Mar. 5, 2003, which is incorporated herein by reference in its entirety. Suitable conditions for hydrocracking and hydrotreating a hydrocarbon stream derived from Fischer-Tropsch synthesis are described below.

As used herein, "hydrotreating" means treating a hydrocarbon stream with hydrogen without making any substantial change to the carbon backbone of the molecules in the hydrocarbon stream. For example, hydrotreating a hydrocarbon stream comprising predominantly $H_2C=CH-CH_2-CH_2-CH_3$ would yield a hydrocarbon stream comprising predominantly $CH_3-CH_2-CH_2-CH_2-CH_3$. Hydrotreating a hydrocarbon stream derived from Fischer-Tropsch synthesis can take place with hydrotreating catalysts comprising at least one of the following metals: molybdenum (Mo), tungsten (W), nickel (Ni), palladium (Pd), platinum (Pt), ruthenium (Ru), iron (Fe), and cobalt (Co). Hydrotreating catalysts, such as those comprising Ni, Pd, Pt, Ni—W, Ni—Mo, Co—W, or Co—Mo, may be operated at a temperature of from about 320° F. to about 800° F. (from about 160° C. to about 425° C.). Additionally, other parameters such as the pressure and liquid hourly space velocity may be varied by one of ordinary skill in the art to effect the desired hydrotreating. Preferably, the hydrogen partial pressure is in the range of from about 100 psia to about 2,000 psia (from about 690 kPa to about 13,800 kPa). The liquid hourly space velocity is preferably in the range of from about 1 to about 10 $hr^{-1}$, more preferably from about 0.5 to about 6 $hr^{-1}$. Other specific hydrotreating conditions pertaining to ultra-low severity hydrotreating of a hydrocarbon stream derived from Fischer-Tropsch synthesis, which can be used for this application, are disclosed in the co-owned U.S. patent application entitled "Methods for Treating Organic Compounds and Treated Organic Compounds," filed Mar. 5, 2003.

As used herein, "hydrocracking" means splitting an organic molecule and adding hydrogen to the resulting molecular fragments to form two smaller hydrocarbons (e.g., $C_{10}H_{22}+H_2 \rightarrow C_4H_{10}$ and skeletal isomers+$C_6H_{14}$ and skeletal isomers). Because a hydrocracking catalyst can be active in hydroisomerization, there can be some skeletal isomerization during the hydrocracking step; therefore, isomers of the smaller hydrocarbons can be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 260° C. to about 400° C.) and at a hydrogen partial pressure of from about 500 psia to about 1,500 psia (from about 3,400 kPa to about 10,400 kPa). Specific hydrocracking conditions, which can be used for this application, pertaining to hydrocracking in conjunction with ultra-low severity hydrotreating of a FT stream are disclosed in the co-owned U.S. patent application entitled "Methods for Treating Organic Compounds and Treated Organic Compounds," filed Mar. 5, 2003 now published as U.S. 20040173501 A1.

The hydrocarbons recovered from the hydrocracker are further refined to form hydrocarbon products stream 42, which contains materials that can be used as components of mixtures known in the art such as naphtha, diesel, kerosene, jet fuel, lube oil, and wax. Hydrocarbon products stream 42 is essentially free of sulfur. The diesel may be used to produce environmentally friendly, sulfur-free fuels and/or blending stocks for fuels by using as is or blending with higher sulfur fuels. A light off gas stream 44 comprising primarily $H_2$ also exits product upgrading unit 40. The light off gas can be used as fuel in various units of the GTL plant such as pre-heaters and/or gas turbines as described previously. A portion of the light off gas, as indicated by stream 46, can also be recycled to POX reactor 28 to reduce the formation of carbon therein. Additional information regarding the introduction of $H_2$ to a POX reactor can be found in U.S. patent application Ser. No. 10/299,193, filed Nov. 19, 2002, entitled "The Production of Synthesis Gas from a Feed Stream Comprising Hydrogen", which is incorporated by reference herein in its entirety.

Various auxiliary sources of $H_2$ (i.e., $H_2$ generators) can be used singly or in combination to supply the $H_2$ required for product upgrading process 40 and/or for other $H_2$ users in the GTL plant. An used herein, "auxiliary source of $H_2$" means any hydrogen containing stream from a refinery, gas plant or chemical plant nearby the GTL plant. A feed gas stream 50 comprising hydrocarbons recovered from a gas plant may be passed to one or more auxiliary $H_2$ sources 52. Preferred auxiliary $H_2$ sources 52 include a secondary syngas production process, e.g., a POX process, an autothermal reforming (ATR) process, or a steam reforming (SR) process such as stream methane reforming (SMR), a SR process followed by a WGS process and optionally followed by a $CO_2$ removal process, or a combination thereof; a carbon filament (CF) production process; an aromatic production process; a process for producing primarily olefins such as hydrocarbon cracking, oxidative dehydrogenation, dehydrogenation, petroleum refining, and the like; and combinations thereof.

The POX process and the SR process mentioned above have been described previously in the specification. The ATR process employs a combination of steam reforming and partial oxidation. More particularly, the endothermic heat required for the steam reforming reaction may be obtained from the exothermic partial oxidation reaction. The remainder of the preferred auxiliary $H_2$ sources are described as follows.

The CF process mentioned above involves feeding hydrocarbons, preferably ethane and propane recovered from a gas plant, to a carbon filament reactor for catalytic conversion to carbon filaments. Hydrogen is formed as a by-product of the catalytic reaction. The CF reactor contains any suitable catalyst for promoting the growth of carbon filaments from hydrocarbons. The CF catalyst is preferably a metal catalyst, which is defined herein as comprising elemental iron, nickel, cobalt, or chromium; alloys comprising the foregoing metals; oxides of the forgoing metals and alloys; and combinations of the foregoing metals, alloys, and oxides. The CF catalyst may be formed into any appropriate structure such as a wire, gauze, mesh, sheets, spheres, rods, or coated supports. Preferred CF catalysts include Ni gauze, a nickel-copper alloy screen or wire known as MONEL alloy 400, which is commercially available from Marco Specialty Steel Inc., and a nickel-chromium alloy known as Nichrome, which is commercially available from Parr Instruments, Inc.

The CF reactor is configured to support the chosen CF catalyst and to accommodate harvesting of the carbon filaments upon completion of their growth cycle. The CF reactor is further configured such that the carbon filaments can be removed from the metal catalyst and/or reactor vessel. While the CF reactor may be a batch reactor, it is preferably a continuous reactor such as the one shown in FIG. 6 of Tibbetts, *Vapor Grown Carbon Fibers*, NATO ASI Series E: Applied Sciences, Vol. 177, pp. 78 (1989). Within the CF reactor, the reaction zone is maintained at conversion-promoting conditions effective to produce carbon filaments. The process is operated at atmospheric or slightly elevated pressures. Depending on the catalyst arrangement, preheating the feed gas may be preferred over preheating the catalyst. The temperature of the gases contacting the catalyst preferably ranges from about 350° C. to about 1,000° C., more preferably ranges from about 450° C. to about 800° C., and most preferably ranges from about 550° C. to about 700° C. The gas hourly space velocity preferably ranges from about 1,000 $hr^{-1}$ to about 100,000 $hr^{-1}$, more preferably from about 5,000 $hr^{-1}$ to about 50,000 $hr^{-1}$ and most preferably from about 10,000 $hr^{-1}$ to about 30,000 $hr^{-1}$.

Further aspects of the carbon filament production process employed for the present invention can be found in U.S. patent application Ser. No. 10/263,315, filed Oct. 1, 2002, entitled "Process for Converting Alkanes to Carbon Filaments" and now published as U.S. 20040062701 A1, which is incorporated by reference herein in its entirety. which is incorporated by reference herein in its entirety.

The aromatic production process mentioned above converts light hydrocarbons such as methane to aromatics via a non-oxidative catalytic reaction. Aromatic hydrocarbons, such as benzene, xylenes, naphthalene, and hydrogen are formed in an aromatic production reactor. The catalyst contained in the reactor preferably comprises a crystalline aluminosilicate molecular sieve. The external surface acidity of this crystalline aluminosilicate is eventually selectively passivated by means of an amorphous silica layer. The molecular sieve may be, e.g., a pentasil crystalline aluminosilicate. As used herein, pentasil refers to a class of shape-selective molecular sieves. Of the class of pentasil crystalline aluminosilicates, the preferred aluminosilicates are ZSM-5, ZSM-8, ZSM-11, ZSM-23 and ZSM-35, with ZSM-5 being particularly preferred. The ZSM-5 molecular sieve is a coarse crystalline, three-dimensional, stable structure consisting of two sets of intersecting channels through 10-membered ring windows, one straight (5.3×5.6 A) and the other sinusoidal (5.1×5.5 A). This aluminosilicate may be represented by the general formula:

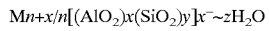

$$M_{n+x/n}[(AlO_2)_x(SiO_2)_y]x^-\sim zH_2O$$

where M is a cation that is a positively charged ion selected from a metal ion or an organic ion of valence n or hydrogen, x+y is the total number of tetrahedrals per cell, and z is a function of the degree of hydration and varies from 0 to 16.

Metal cations useful in the formation of ZSM-5 molecular sieves include alkali metals or alkaline earth metals. Because of the basic conditions required for crystallization of the aluminosilicate, the source of such a cation usually is a hydroxide, preferably sodium hydroxide. Organic compounds useful in preparing ZSM-5 molecular sieves include alkylammonium cations or precursors such as tetraalkylammonium compounds. Most preferably, it is tetrapropylammonium cations.

The crystalline material can be prepared by mixing a silica source, an alumina source, an alkali metal hydroxide, a nitrogen-containing organic base as template, and water. Preparation of ZSM-5 molecular sieve is described in greater detail in U.S. Pat. Nos. 3,702,886 and Re. 29,948, which are hereby incorporated herein by reference for all purposes. The preferred ZSM-5 crystalline aluminosilicate has a silica-to-alumina ratio of 50:1.

The methane conversion catalyst used in the aromatization process preferably contains a metal component. The preferred metal component is molybdenum or molybdenum compounds. The final methane conversion catalyst preferably contains less than 10 weight % metal as measured on an elemental analysis basis, more preferably from about 0.5 to about 4.0 weight % metal, and most preferably from about 0.5 to about 2.0 weight % metal.

Catalytically active metal may be deposited onto the crystalline aluminosilicate by means of any of the following methods. The catalytically active metal may be added by the incipient wetness impregnation of a water soluble metal salt, such as the ammonium heptamolybdate. Another suitable method is the direct vaporization of the catalytically active metal, such as molybdenum oxide, onto the crystalline aluminosilicate. Other methods as are known in the art may also be used. It is preferred that the catalytically active metal is uniformly distributed throughout the entire network of the final methane conversion catalyst rather than merely on the surface of such catalyst.

The crystalline metal-loaded aluminosilicate may be further admixed with an amorphous silica matrix, depending upon the intended process use. Typically, the surface of the crystalline aluminosilicate is covered with an amorphous silica layer to improve shape selectivity by passivating the external surface of the support which contains acidic sites, coke precursor sites, and non-shape selectivity molybdenum catalyst. The amorphous silica passivating layer has no effect on the accessibility of the pores of the molecular sieve. Amorphous silica layers may be obtained by means of well known techniques as are understood by one skilled in the art. Preferably, said amorphous silica layer is placed on the surface of the crystalline aluminosilicate by means of chemical vapor deposition (CVD) or by means of chemical liquid deposition (CLD) of silicon alkoxides, most preferably tetraethoxysilane. The crystalline aluminosilicate composition that is formed can be separated and recovered by filtration with aqueous washing. Typically, calcination at temperatures ranging from about 350° C. to about 600° C. and preferably from about 450° C. to about 550° C. is necessary to remove organic compounds on the surface of the molecular sieve. The final methane conversion catalyst can be pelletized and thereafter crushed, and the result sieved to 0.250 to 0.425 mm particles.

Within the aromatic production reactor, the reaction zone is maintained at conversion-promoting conditions effective to produce aromatics. The reaction zone is preferably operated at a temperature between about 600° C. and about 800° C., more preferably between about 675° C. and about 750° C. The reaction can takes place at atmospheric pressure, but the pressure is preferably within the approximate range of about 0.5 bar to 5 bar, more preferably between about 0.5 bar and about 2 bar. The reaction is accomplished using a weight hourly space velocity (WHSV) between about 0.1 and about 10 h-1, more preferably between about 0.1 and 4 h-1. This process produces a reaction zone effluent stream comprising methane, hydrogen, and a selectivity to products from $C_6$ to $C_{10}$ preferably greater than about 30%, more preferably greater than 45%, and most preferably greater than 60%. In an alternative embodiment, a multi-stage process may be employed to convert methane to aromatics.

Further aspects of the aromatic production process employed for the present invention can be found in U.S. patent application Ser. No. 09/916,469, filed Jul. 27, 2001, entitled "Catalyst and Process for Aromatic Hydrocarbons Production from Methane"; and now issued as U.S. Pat. No. 6,552,243; U.S. patent application Ser. No. 10/139,502, filed May 6, 2002, entitled "Non-Oxidative Conversion of Gas to Liquids" and now published as U.S. 20030144565 A1; and U.S. patent application Ser. No. 10/139,485, filed May 6, 2002, entitled "Catalyst System and Method for Conversion of Light Hydrocarbons to Aromatics" and now published as U.S. 20030083535 A1, each of which is incorporated by reference herein in its entirety.

The aforementioned olefin production process via hydrocarbon cracking of hydrocarbons is known in the art. This process involves the thermal cracking of a variety of hydrocarbons, such as naphtha, gas oil, liquefied petroleum gas (LPG), and light hydrocarbons, to produce olefins such as ethylene and propylene. The effluent from the cracking step, which is known as charge gas or cracked gas, contains a number of products ranging from hydrogen to pyrolysis fuel oil. These products are separated via fractionation into various product and by-product streams, followed by the hydrogenation of at least some of the unsaturated by-products. Further aspects of the hydrocarbon cracking process can be found in U.S. Pat. No. 5,925,799, which is incorporated by reference herein in its entirety.

The oxidative dehydrogenation (ODH) process mentioned above involves converting gaseous hydrocarbon gas to primarily olefins. In particular, oxygen ($O_2$) and at least one hydrocarbon, such as ethane and propane that has been separated from other components of a natural gas stream, are fed to an ODH reactor. In the ODH reactor, the hydrocarbon reacts with the $O_2$ in the presence of a catalyst to produce syngas via partial oxidation and olefins via oxidative dehydrogenation. Any suitable reactor configuration that allows contact between the hydrocarbon reactant and the catalyst may be employed for the ODH reactor. One suitable configuration is a fixed catalyst bed in which the catalyst is retained in a fixed arrangement within a reaction zone of the reactor vessel. The catalyst may be employed in the fixed bed regime using well-known fixed bed reaction techniques. Preferably, the ODH reactor is a short-contact time reactor, such as a millisecond contact time reactor. A general description of major considerations involved in operating a reactor using millisecond contact times, e.g., not more than 500 microseconds, is given in U.S. Pat. No. 5,654,491, which is incorporated herein by reference. Additional disclosure regarding suitable ODH reactors and the ODH process is provided in Schmidt et al., New Ways to Make Old Chemicals, Vol 46, No. 8 AIChE Journal p. 1492–95 (August 2000); Bodke et al., Oxidative Dehydrogenation of Ethane at Millisecond Contact Times: Effect of H2 Addition, 191 Journal of Catalysis p. 62–74 (2000); Iordanoglou et al., Oxygenates and Olefins from Alkanes in a Single-Gauze Reactor at Short Contact Times, 187 Journal of Catalysis p. 400–409 (1999); and Huff et al., Production of Olefins by Oxidative Dehydrogenation of Propane and Butanes over Monoliths at Short Contact Times, 149 Journal of Catalysis p. 127–141 (1994), each of which is incorporated by reference herein in its entirety.

The ODH reactor contains any suitable catalyst for promoting the conversion of hydrocarbon gas to olefins and syngas. The catalyst preferably resides on a ceramic support composed of an oxide that is stable (i.e., unreactive) at the operating temperature of ODH reactor, e.g., alumina ($Al_2O_3$). The catalyst may be of any suitable form, including foam, monolith, gauze, spheres, particulates, or the like, for operation at the desired gas velocities with minimal back pressure. The catalyst comprises a catalytically active component, e.g., palladium, platinum, iridium, osmium, nickel, chromium, cobalt, cerium, lanthanum, and mixtures thereof. The particular catalyst used in the ODH reactor can be selected based on whether one desires to maximize syngas production or to maximize olefins production. For example, a catalyst that is capable of maximizing the production of syngas, such as iridium on an alumina ($Al_2O_3$) support, may be disposed within the ODH reactor vessel. Alternatively, a catalyst that is capable of maximizing the production of olefins, such as platinum on an alumina support, may be disposed in the ODH reactor vessel. U.S. Pat. No. 6,072,097 and WO Pub. No. 00/43336 describe the use of platinum and chromium oxide-based monolith ODH catalysts for ethylene production with SCTRs; and U.S. Pat. No. 6,072,097 describes the use of Pt-coated monolith ODH catalysts for use in SCTRs, each of these references being incorporated by reference herein in its entirety.

Within the ODH reactor, the reaction zone is maintained at conversion-promoting conditions effective to produce olefins and syngas comprising $H_2$ and CO. The operating conditions of the ODH reactor may be optimized to maximize syngas production and minimize olefins production, or vice versa. Preferably, the process is operated at atmospheric or super atmospheric pressures, the latter being preferred. The pressures may range from about 100 kPa to about 12,500 kPa, preferably from about 130 kPa to about 5,000 kPa. The catalyst temperatures may range from about 400° C. to about 1200° C., preferably from about 500° C. to about 900° C. The GHSV for the process ranges from about 20,000 to at least about 100,000,000 NL/L/h, preferably from about 500,000 to about 5,000,000 NL/L/h. Residence time is inversely proportional to space velocity, and high space velocity indicates low residence time on the catalyst. In a preferred millisecond contact time reactor, the residence time of the reactant gas mixture with the ODH catalyst is no more than about one second.

Further aspects of the ODH process employed for the present invention can be found in Published U.S. Patent Application No. 2003-0040655; and U.S. patent application Ser. No. 10/263,324, filed Jan. 4, 2002, entitled "Integrated Oxidative Dehydrogenation/Carbon Filament Production Process and Reactor Therefor" and now published as U.S. 20030129121 A1, each of which is incorporated by reference herein in its entirety.

A suitable dehydrogenation process for use as one of the auxiliary $H_2$/CO sources 52 is a catalytic dehydrogenation process for producing light olefins from their corresponding paraffins, e.g., the production of propylene from propane. An example of such a dehydrogenation process is the Oleflex™ process of UOP LLC of Des Plaines, Ill. Further aspects of the Oleflex™ process can be found in Oleflex™ Process for Propylene Production. 1998. http://www.uop.com/techsheets/oleflex.pdf, which is incorporated by reference herein in its entirety.

Suitable petroleum refining processes for use as auxiliary $H_2$/CO sources 52 are disclosed in Meyers, Robert A. Ed. 2nd ed. Handbook of Petroleum Refining Processes. McGraw-Hill, 1996; Magee, John and Dolbear, Geoffrey. Petroleum Catalysis in Nontechnical Language. Pennwell Publishing Company, 1998; and Gary, James H. and Handwerk, Glenn E. Ed. 3rd ed. Petroleum Refining Technology and Economics. Marcel Dekker, Inc., 1994, each of which is incorporated by reference herein in its entirety.

As shown in FIG. 1, an effluent stream 54 recovered from one or more auxiliary $H_2$ sources 52 may be subjected to a separation process 56 to form a hydrogen rich stream 58 primarily comprising $H_2$ and a hydrogen lean stream 60 primarily comprising gases other than $H_2$. Although not shown, a portion of effluent stream 54 or a portion of hydrogen rich stream 58 may be passed to FT process stage 34. Separation process 56 may be performed using any known separation technique such as PSA or membrane separation. In the case where a secondary syngas production process serves as an auxiliary source of $H_2$, separation process 56 preferably includes a WGS reactor and a $CO_2$ removal process. Hydrogen rich stream 58 comprises preferably greater than about 50 volume % $H_2$, more preferably greater than about 70 volume % $H_2$, and even more preferably greater than about 90 volume % $H_2$, based on the total volume of the stream. Hydrogen lean stream 60 can be used to meet various fuel needs in the GTL plant as described previously.

In addition to being passed to product upgrading unit 40, hydrogen rich stream 58 may be passed to one or more other users of $H_2$ in the GTL plant. FIG. 1 depicts a portion of hydrogen rich stream 58 being passed to a Fischer-Tropsch water stripper 64 via stream 62. The FT water stripper 64 is preferably employed in the GTL plant when FT process stage 34 includes a slurry-bubble reactor that produces a water-rich slurry containing hydrocarbons. A portion of the water-rich slurry may be removed from the slurry-bubble reactor and conveyed to FT water stripper 64 via stream 65. FT water stripper 64 uses $H_2$ to strip water from the water-rich slurry. The resulting water-reduced slurry can then be returned to the slurry-bubble reactor via stream 65. Suitable water stripping processes are described in U.S. patent application Ser. No. 10/034,452, filed Dec. 28, 2001, entitled "Water Stripping and Catalyst/Liquid Product Separation System", which is incorporated by reference herein in its entirety.

FIG. 1 also depicts another portion of hydrogen rich stream 58 being passed to an FT catalyst regeneration unit 68 via stream 66. The FT catalyst regeneration unit 68 is preferably employed when the activity of the FT catalyst has, due to a number of factors, deteriorated over time. A batch, semi-batch, or continuous regeneration process may be used that includes passing at least a portion of the catalyst in an FT reactor of FT process stage 34 to regeneration unit 68, regenerating the catalyst, and passing the catalyst back to the FT reactor, as indicated by stream 67. Alternatively, the catalyst may be regenerated within the FT reactor by cycling between a reaction mode and a regeneration mode. In this situation, hydrogen rich stream 58 would be conveyed to the FT reactor rather than to a separate regeneration unit. Suitable FT catalyst regeneration processes are described in patent application Ser. No. 10/251,928, filed Sep. 20, 2002, entitled "Fischer-Tropsch Catalyst Regeneration" and published as U.S. 20040059009; patent application Ser. No. 60/412,598, filed Sep. 20, 2002, entitled "Slurry Activation and Regeneration of Fischer-Tropsch Catalyst with Carbon Monoxide Co-Feed" and now published as U.S. 20040127585; and patent application Ser. No. 10/251,139, filed Sep. 20, 2002, entitled "Method and Apparatus for the Regeneration of Hydrocarbon Synthesis Catalysts" published as U.S. 20040059008, each of which is incorporated by reference herein in its entirety.

FIG. 1 depicts hydrogen produced by at least one auxiliary source being passed to multiple users of hydrogen in a Fischer-Tropsch process. It is to be understood that the number and type of auxiliary sources as well as the number and type of hydrogen users may be combined in a variety of different embodiments. For example, one embodiment may include passing the hydrogen from a single auxiliary source to a water stripper and a FT catalyst regeneration process whereas another embodiment may include passing the hydrogen from a plurality of auxiliary sources to a water stripper and a product upgrading process.

While the preferred embodiments of the invention have been shown and described, modifications thereof can be made by one skilled in the art without departing from the spirit and teachings of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A process for synthesizing hydrocarbons, comprising the steps of:
   (a) making a synthesis gas stream in a syngas generator, wherein the synthesis gas stream comprises primarily hydrogen and carbon monoxide;
   (b) catalytically converting the synthesis gas stream in a synthesis reaction to produce hydrocarbons and water;

(c) making a hydrogen-rich stream in a hydrogen generator, wherein the hydrogen generator is separate from the syngas generator of step (a) and comprises at least one of the following:
  (1) a process for converting hydrocarbons to olefins;
  (2) a process for catalytically dehydrogenating hydrocarbons;
  (3) a process for refining petroleum; and
  a process for converting hydrocarbons to carbon filaments
(d) consuming hydrogen from the hydrogen-rich stream produced in step (c) in one or more processes that enhance the value of the hydrocarbons or the productivity of the conversion to hydrocarbons in step (b).

2. The process according to claim 1, wherein the step (d) of consuming hydrogen comprises at least one of: regenerating the catalyst used in the synthesis reaction; stripping water from the synthesis reaction in step (b); and refining the hydrocarbons produced in step (b) into hydrocarbon products.

3. The process according to claim 2 wherein the step of creating a hydrogen-rich stream further comprises subjecting the hydrogen-rich stream of the hydrogen generator to a separation process to increase the hydrogen concentration of the hydrogen-rich stream.

4. The process according to claim 3 wherein the separation process reduces the carbon dioxide and carbon monoxide concentration of the hydrogen-rich stream and the hydrocarbon production process more specifically includes the steps of regenerating the catalyst used in the synthesis reaction and upgrading the hydrocarbons produced in step (b) into hydrocarbon products and wherein the hydrogen-rich stream is provided to the regenerating and upgrading processes.

5. The process according to claim 1 wherein the step (c) of making a hydrogen-rich stream comprises a process for converting hydrocarbons to synthesis gas and subjecting the product therefrom to a water-gas-shift reaction to increase the hydrogen concentration of the hydrogen-rich stream.

6. The process according to claim 1 wherein the syngas generator in step (a) comprises a catalytic partial oxidation.

7. A process for synthesizing hydrocarbons, comprising the steps of:
  (a) making a synthesis gas stream in a syngas generator, wherein the synthesis gas stream comprises primarily hydrogen and carbon monoxide;
  (b) catalytically converting the synthesis gas stream in a synthesis reaction zone to produce hydrocarbons and water;
  (c) making a hydrogen-rich stream in a hydrogen generator, wherein the hydrogen generator is separate from the syngas generator of step (a) and comprises at least one of the following:
    (1) a process for converting hydrocarbons to aromatics;
    (2) a process for catalytically cracking hydrocarbons; and
  (d) consuming hydrogen from the hydrogen-rich stream produced in step (c) in one or more processes that enhance the value of the hydrocarbons produced in step (b) or in a water stripping unit that strips water from the synthesis reaction zone in step (b).

8. The process according to claim 7 wherein the syngas generator in step (a) comprises a catalytic partial oxidation.

9. The process according to claim 7, wherein the hydrocarbon production process includes upgrading the hydrocarbons produced in step (b) into hydrocarbon products in one or more upgrading processes, and wherein step (d) comprises providing the hydrogen-rich stream to the one or more upgrading processes.

10. A process for synthesizing hydrocarbons, comprising the steps of:
  (a) making a synthesis gas stream in a catalytic partial oxidation reaction, wherein the synthesis gas stream comprises primarily hydrogen and carbon monoxide;
  (b) catalytically converting the synthesis gas stream in a synthesis reaction zone to produce hydrocarbons and water;
  (c) making a hydrogen-rich stream in a hydrogen generator, wherein the hydrogen generator is separate from the syngas generator of step (a) and comprises at least one of the following:
    (1) a process for converting hydrocarbons to synthesis gas, said process comprising an autothermal reformer or a steam reformer;
    (2) a process for converting hydrocarbons to olefins;
    (3) a process for catalytically dehydrogenating hydrocarbons;
    (4) a process for refining petroleum; or
    (5) a process for converting hydrocarbons to carbon filaments; and
  (d) consuming hydrogen from the hydrogen-rich stream produced in step (C) in one or more processes that enhance the value of the hydrocarbons or the productivity of the conversion to hydrocarbons in step (b).

11. The process according to claim 10, wherein the hydrocarbon production process includes upgrading the hydrocarbons produced in step (b) into hydrocarbon products in one or more upgrading processes, and wherein step (d) comprises providing the hydrogen-rich stream to the one or more upgrading processes.

12. The process according to claim 11 wherein at least one of the one or more upgrading processes comprises hydrocracking, hydrotreating, or any combinations thereof.

13. The process according to claim 10, wherein step (d) comprises at least one of: regenerating the catalyst used in the synthesis reaction zone or stripping water from the synthesis reaction zone in step (b).

14. The process according to claim 13 wherein the step of creating a hydrogen-rich stream further comprises subjecting the hydrogen-rich stream of the steam reformer to a separation process to increase the hydrogen concentration of the hydrogen-rich stream.

15. The process according to claim 10 wherein the hydrogen generator in step c) comprises a steam reformer.

16. The process according to claim 10 wherein the hydrogen generator comprises a steam reformer or an autothermal reformer, and wherein the step (c) of making a hydrogen-rich stream further includes subjecting a synthesis gas product therefrom to a water-gas-shift reaction to increase the hydrogen concentration of the hydrogen-rich stream.

17. The process according to claim 16, wherein the water-gas shift process is followed by a $CO_2$ removal process.

18. The process according to claim 10 wherein the synthesis reaction zone in step (b) comprises a multi-stage process comprising two or more process stages in series.

19. The process according to claim 18 wherein at least one process stage comprises one or more reactors arranged in parallel.

20. The process according to claim 18 wherein the hydrogen-rich stream or a slipstream thereof is introduced to each process stage for raising a $H_2:CO$ ratio of its feedstream.

* * * * *